United States Patent [19]

Hamilton

[11] Patent Number: 5,081,176

[45] Date of Patent: Jan. 14, 1992

[54] POLYALKYLENE TEREPHTHALATE COMPOSITIONS HAVING IMPROVED BURNING CHARACTERISTICS

[75] Inventor: Douglas G. Hamilton, Mt. Vernon, Ind.

[73] Assignee: General Electric Company, Schenectady, N.Y.

[21] Appl. No.: 586,926

[22] Filed: Sep. 24, 1990

[51] Int. Cl.⁵ .................................... C08K 3/22
[52] U.S. Cl. .................................... 524/430; 524/513; 524/494; 524/546
[58] Field of Search ................. 524/513, 430, 494, 546

[56] References Cited

U.S. PATENT DOCUMENTS 2,167,278  11/1935  Leatherman ................... 524/430
3,671,487  6/1972  Abolins ........................ 524/513

FOREIGN PATENT DOCUMENTS 099256  12/1971  Japan .
7199256  2/1985  Japan .
7199257  2/1985  Japan .
210446  5/1986  Japan .

Primary Examiner—Paul R. Michl
Assistant Examiner—Tae H. Yoon
Attorney, Agent, or Firm—William A. Teoli; James C. Davis, Jr.; William H. Pittman

[57] ABSTRACT

Aromatic thermoplastic compositions are provided having reduced total smoke released upon burning in accordance with ASTM-EO96. The aromatic thermoplastic compositions utilize an effective amount of tin monoxide, and which are substantially free of antimony trioxide and brominated organic flame retardant resins. Minor amounts of polytetrafluoroethylene resin and glass fiber also contribute to the reduction of total smoke release upon burning of the thermoplastic polyester.

2 Claims, No Drawings

POLYALKYLENE TEREPHTHALATE COMPOSITIONS HAVING IMPROVED BURNING CHARACTERISTICS

BACKGROUND OF THE INVENTION

The present invention relates to aromatic thermoplastic polyester compositions having improved burning characteristics. More particularly, the present invention relates to the employment of tin monoxide in aromatic thermoplastic polyesters to reduce the amount of smoke generated during the burning of the aromatic thermoplastic polyester.

Prior to the present invention, as shown by Japanese patents 7199256 and 7199257, file resistant plastics can be prepared by incorporating a mixture of tin monoxide and antimony trioxide into a halogen containing polyester. The resulting resin self extinguished in 2.5 seconds after it was removed from flame. Although self extinguishing aromatic thermoplastic resins are of significant interest to the plastics industry, it has been found that aromatic thermoplastic polyesters, which are often used in applications such as countertops and window moldings, can generate an unacceptable level of smoke when burned. Total Smoke/$M^2$ or "TS" is a value recognized by the thermoplastic industry as a measure of smoke performance for a burning thermoplastic.

In order to determine the TS value of a burning thermoplastic, a heat test such as (ASTM-EO96) can be used which is defined as follows:

Polymer plaques ($6'' \times 6'' \times 1/16''$) are mounted in the horizontal mode of a test chamber. The environmental test chamber contains a constant flow of air throughout the test. Combustion is initiated by a non-piloted ignition, a piloted ignition of evolved gases, or by point ignition of the surface. If ignited by piloted ignition, the end of the burner tubing is 10 mm above and perpendicular to the exposed horizontal surface of the specimen. Changes in the optical density of gas leaving the chamber are monitored and from this data, smoke release rates are determined. The results for total smoke evolved and smoke release rates are reported in smoke/squared meter of sample and smoke/min/squared meter respectively. The "Smoke" unit is defined by the concentration of smoke particulates in a cubic meter of air that reduces the percent transmission of light through a 1 meter path to 10% as measured by a calibrated photometer. Calculations: Smoke Release Rate $= D/kLA(V_o/t)$ where:

$K$ = absorption coefficient = 1.0 squared meter/smoke
$D$ = optical density (absorbance = log (100% T)
$L$ = light path = 0.134 m (stack width)
$A$ = exposed surface area of specimen, squared meter
$V_o/t$ = flow rate of air leaving apparatus, cubic meter/min $= V_i/t \times T_o/T_i$
$V_i/t$ = flow rate of air entering apparatus, cubic meter/min
$T_i, T_o$ = absolute temperature of air in and out of apparatus respectively.

SUMMARY OF THE INVENTION

The present invention is based on the discovery that SnO can be used to substantially reduce the TS value of a burning aromatic thermoplastic polyester, particularly if it is used in the absence of flame retardants, such as antimony oxide and brominated aromatic organic materials. It also has been found that additional improvements in the TS value for aromatic thermoplastic polyester can be achieved if SnO is used in combination with glass fiber. Further improvements in TS values of aromatic thermoplastic polyester can be realized if the SnO is used in combination with a minor amount of a polytetrafluoroethylene resin, which includes such resins presently available from E. I. duPont de Nemours Company of Wilmington, Del., for example, Teflon ® resin, which can be incorporated as part of a masterbatch with a thermoplastic resin carrier.

STATEMENT OF THE INVENTION

There is provided by the present invention, an aromatic thermoplastic polyester composition having improved burning characteristics and substantially free of antimony trioxide and brominated organic materials, which aromatic thermoplastic polyester composition comprises by weight at least about 20% of aromatic thermoplastic polyester, at least about 1% of SnO, and from about 0 to 79% of a reinforcing filler.

The polyesters suitable for use herein may be any of the linear or branched saturated polyesters known to those skilled in the art. Generally, the polyesters will comprise linear saturated polyesters derived from alkylene glycols such as ethylene glycol, propylene glycol, 1,4-butanediol, etc. including cycloaliphatic glycols, such as 1,4-cyclohexanedimethanol and mixtures of any of these glycols with one or more aromatic dicarboxylic acids such as terephthalic acid or aliphatic acids such as cyclohexane dicarboxylic acid. Preferably, the polyesters can comprise polyalkyene terephthalates prepared by known techniques, such as the transesterification of esters of terephthalic acid alone, or mixtures of esters of terephthalic acid and isophthalic acid with a glycol, or a mixture of glycols, and subsequent polymerization by heating the glycols and the free acids or halide derivatives thereof. Suitable methods are described in U.S. Pat. No. 2,465,319 and No. 3,045,539 incorporated herein by reference. In addition, blends of one or more of these polyesters or copolyesters may be employed. Suitable poly(1,4-butylene terephthalate) resins are commercially available from General Electric Company under the trade designation VALOX ® 315 and 420 which contains glass fiber. In addition, poly(ethylene terephthalate) resins are well known and available commercially.

The aromatic polyester resins used in the practice of the present invention can be blended with various ingredients, such as Teflon resin and tin monoxide to impart improved burning characteristics thereto. Tin monoxide can be utilized in a proportion of from 1% to 80% by weight of the aromatic thermoplastic polyester composition and preferably from 1 to 20% by weight to provide for effective reduction in total smoke. Teflon resin, can be incorporated into the aromatic polyester along with tin monoxide. Teflon resin can be used in the aromatic thermoplastic polyester composition in a proportion of from 0 to 20% by weight thereof, and preferably from 0.1 to 5% by weight of the aromatic thermoplastic polyester composition. Teflon resin can be utilized as a concentrate in combination with a thermoplastic material, such as a polycarbonate having a proportion of about 20% Teflon resin based on the weight of the Teflon resin-polycarbonate blend.

In addition to the aforementioned additives, there also can be incorporated into the aromatic thermoplastic polyester, fillers such as, talc, calcium carbonate, powdered silicon, clay, carbon fibers, mica. It is preferred to incorporate glass fiber in proportions of from 1% to 50% by weight based on the weight of the flame retardant aromatic thermoplastic polyester for optimum burning characteristics.

In order that those skilled in the art will be better able to practice the present invention, the following examples are given by way of illustration and not by way of limitation. All parts are by weight.

EXAMPLE 1

There was hand mixed, 1200 grams of Valox ® 420, a polybutylene terephthalate resin of GE Co. having about 30% by weight of glass fiber in the form of pellets with 84 grams of tin monoxide and 4 grams of a blend of 20 parts of Teflon resin and 80 parts of polycarbonate (Teflon resin/PC) along with 4 grams of a mineral oil as a mixing agent. The resulting mixture was extruded on a single screw extruder at 475° F. The resulting extrudate was then allowed to cool and then injection molded into UL94 parts. The parts were cut up and compression molded into 6×6 inch plaques at 475° F. The plaques were then evaluated for burning characteristics utilizing ASTM-E096 procedures.

Additional 6×6 inch test plaques were also made utilizing the glass filled polybutylene terephthalate resin and the same resin blended with antimony trioxide, a brominated flame retardant polycarbonate (FR25) and Teflon resin following the same procedure as previously described. The following results were obtained:

TABLE 1

|  | Max Rate of Heat Release kW/m² | Max Smoke Release Rate smk/min m² | Total Heat Released kW min/m² | Total Smoke Released smk/m² |
| --- | --- | --- | --- | --- |
| 100% Valox 420 | 407 ± 27 | 607 ± 42 | 385 ± 14§ | 421 ± 24§ |
| 84.7% Valox 420 + 10.6% FR 25 + 4.1% Sb₂O₃ + 0.6% Teflon resin/PC + 0.6% mineral oil | 148 ± 6 | 981 ± 29 | 193 ± 15§ | 793 ± 13§ |
| 92.9% Valox 420 + 6.5% SnO + 0.6% Teflon resin/PC + 0.6% mineral oil | 162 ± 4 | 202 ± 6 | 410 ± 9* | 191 ± 10* |

§ After 210 seconds.
*After 300 seconds

The above results show that tin monoxide is not only an effective flame retardant additive for reducing the maximum rate of heat release, but tin monoxide is also substantially superior as a smoke reducting additive for glass filled polybutylene terephthalate. Tin monoxide in combination with Teflon resin is also effective as a smoke reducing additive in glass filled polybutylene terephthalate when it is compared to glass filled polybutylene terephthalate used with antimony trioxide and a brominated polycarbonate with respect to reducing total smoke.

It was further found that other divalent tin compounds such as SnF₂, SnCl₂ and tin oxalate having the same valance as tin monoxide, were substantially less effective in reducing total smoke. In addition, a comparison was made with the glass filled polybutylene terephthalate resin containing the same proportion of Teflon resin but substituting tin dioxide for tin monoxide at equivalent proportions by weight. It was found that tin dioxide resulted in a total smoke release value of about 300 as compared to 191 for an equivalent weight of tin monoxide.

EXAMPLE 2

In accordance with the procedure of example 1, additional 6×6 inch plaques were prepared utilizing the glass filled polybutylene terephthalate and Teflon resin in combination with tin monoxide. Tin monoxide was used over a range of from 1 part to 11.25 parts by weight in combination with 0.5 part of Teflon resin per 100 parts of the Valox 420 resin. The following results were obtained where maximum rate of heat release (kW/m2) and total smoke (smk/m2) is shown over the 1 part to 11.25 part range.

TABLE 2

|  | Max Rate of Heat Release kW/m² | Max Smoke Release Rate smk/min m² | Total Heat Released kW min/m² | Total Smoke Released smk/m² |
| --- | --- | --- | --- | --- |
| Control (Valox 420) — 0.5 part Teflon resin/PC (phr) — SnO (phr) | 407 ± 27 | 607 ± 42 | 385 ± 14 | 421 ± 24§ |
| 11.25 | 147 ± 14 | 130 ± 23 | 451 ± 15 | 195 ± 15 |
| 7.75 | 167 ± 13 | 177 ± 20 | 508 ± 3 | 239 ± 11 |
| 4.25 | 241 ± 14 | 306 ± 22 | 503 ± 20 | 328 ± 8 |
| 1.00 | 413 ± 20 | 510 ± 22 | 528 ± 34 | 417 ± 23 |

The above results show that enhanced smoke reduction is achieved with the use of increased amounts of SnO.

EXAMPLE 3

A blend of 7 parts of tin monoxide, and 0.33 part of Teflon resin per 100 parts of Valox 420 was converted to 6×6 inch plaques in accordance with the procedure of example 1. Similar size plaques were also prepared utilizing 10 parts of tin monoxide, with 100 parts of polybutylene terephthalate free of glass fiber along with the same proportion of Teflon resin. The plaques were evaluated for total smoke release in accordance with the procedure of example 1. It was found that the plaques free of the glass fiber exhibited a TS value of about 314, while the plaques containing the glass fiber exhibited a TS value of 161. These results show that glass fiber also is a significant factor in reducing total smoke release from burning polybutylene terephthalate.

Although the above examples are directed to only a few of the very many variables which can be used in the practice of the present invention, it should be understood that the present invention is directed to a much broader variety of aromatic thermoplastic polyesters in combination with various fillers and tin monoxide as set forth in the description preceding these examples.

What is claimed is:

1. A polyalkylene terephthalate composition which exhibits a substantial reduction in total smoke released upon burning, and which is substantially free of antimony trioxide and brominated organic materials, which polyalkylene terephthalate composition consists essentially, of at least 20% by weight of polyalkylene terephthalate, from 1% to 20% by weight of SnO, from 0.1 to 5% by weight of polytetrafluoroethylene, and 1 to 50% by weight of glass fiber.

2. A composition in accordance with claim 1, where the polyalkylene terephthalate is a polybutyleneterephthalate.

* * * * *